Patented Mar. 30, 1943

2,315,432

UNITED STATES PATENT OFFICE 2,315,432

CASTING OF PHENOLIC RESINS

Edward L. Kropa, Old Greenwich, Conn., assignor to American Cyanamid Company, New York, N. Y., a corporation of Maine No Drawing. Application April 26, 1940, Serial No. 331,755

3 Claims. (Cl. 260—58)

This invention relates to an improvement in the preparation of phenol-formaldehyde resins which are condensed at a relatively low temperature and in the presence of a fixed alkaline catalyst. Such resins are suitable for casting to form clear light-colored products.

The process of producing low temperature phenol-formaldehyde resins of the type described herein is set forth in the patent to Oskar Pantke, No. 1,909,786, patented May 16, 1933. In Pantke's process, the caustic alkali which is used as a condensation catalyst is neutralized with lactic acid. If lactic acid be used, the time required to polymerize the resin is about 100 to about 200 hours at about 80° C. Accordingly, relatively long periods of time are required to produce the final resins according to Pantke's process.

Since so much time is required to produce resins according to Pantke's process, manufacturers have generally found it necessary to keep a large inventory on hand in order to fill current orders. This is, of course, an economic burden. The relatively long period of time required to polymerize the cast resins necessitates the use of a large quantity of heat and also necessitates the provision of a large number of ovens or the so-called "vulcanizers." These items are also expensive. Accordingly, it is desirable that the time required for polymerization of the cast resins be substantially reduced.

I have found that many acids will effect an increase in the rate of polymerization of low temperature phenol-formaldehyde resins, but in most instances, it is impossible to obtain clear products and in other instances marked discoloration occurs.

An object of this invention is to accelerate the polymerization of phenol-formaldehyde resins of the type mentioned above and at the same time to produce clear light-colored resins.

This and other objects are attained by adding a small proportion, e. g., 2-5%, of a chloracetic acid or alpha-chlorpropionic acid to the condensation products produced according to Pantke's process, after condensation but before casting. In addition, all or part of the lactic acid used in Pantke's process may be replaced with an equivalent proportion of a chloracetic acid or alpha-chlorpropionic acid. I have found that, by the use of these chlorinated acids, clear light-colored products may be obtained and the polymerization requires a relatively short period of time.

The following examples in which the proportions are in parts by weight are given by way of illustration and not in limitation.

Example 1

To a mixture of phenol and formaldehyde in the proportions by weight of 1 part of phenol and 2-2½ parts of formalin (37% formaldehyde in water) is added about 0.03 part of caustic soda in a 20% aqueous solution. This mixture is heated for about 2-4 hours at a temperature of about 60-80° C. The resulting hot material is subjected to a relatively high vacuum, i. e., about 30 mm. of mercury absolute pressure. The application of the vacuum may cause the temperature to drop to 35-40° C. because of the evaporation of the water present. Therefore, the mass is generally heated, preferably by steam. The temperature of the mass is adjusted to about 60-80° C. and clarified by adding about 2%, together with sufficient chloracetic acid to neutralize the caustic present.

Following the neutralization of the syrup, a suitable dehydrating and plasticizing agent such as glycerine is added. The amount of glycerine required for the resinous syrup prepared above is preferably about 0.1-0.2 part of glycerine. The low heat, preferably around 60-65° C., and high vacuum are continued until dehydration is complete. The method used to ascertain complete dehydration is as follows: A drop of the resin is placed in water at a temperature of about 11-13° C. and if the dehydration is complete, the resin forms a ball of just sufficient hardness to yield slightly to pressure between the fingers. The resin may then be cast into open molds and hardened. The hardening may be accomplished by placing the molds containing the resin in the so-called "vulcanizers" which are kept at a temperature slightly below the boiling point of water, e. g., at about 80° C. (± about 2° C.). The period of curing is generally about 24 to 36 hours.

Resins produced in accordance with the procedure outlined above have excellent physical and chemical properties such as a clear light color and a high strength.

Example 2

The procedure of Example 1 is repeated using dichloracetic acid in place of the chloracetic acid used above.

Example 3

A mixture of phenol and formaldehyde is treated with an aqueous solution of caustic soda as in Example 1. This mixture is heated for about 2-4 hours at a temperature of about 60-80°

C. The resulting hot material is then subjected to a relatively high vacuum, i. e., about 30 mm. of mercury absolute pressure. The temperature of the mass is again adjusted to about 60–70° C. as in Example 1 and clarified by adding sufficient lactic acid to neutralize the caustic present. Glycerine is added as before as a dehydrating and plasticizing agent and the low heat and high vacuum are continued until dehydration is complete. When dehydration is complete, an amount of trichloracetic acid is added equal to about 5% of the total weight of the materials present. The resin may then be cast into open molds and hardened in accordance with the procedure of Example 1. The period of curing is generally about 24–30 hours.

Obviously equivalent amounts of other concentrations of aqueous formaldehyde solution may be substituted in the above examples. Furthermore, the polymers of formaldehyde or substances which yield formaldehyde upon decomposition may be used in place of the aqueous formaldehyde solutions. The molal ratio of formaldehyde to phenol should be about 2.5:1. The caustic soda may be replaced in whole or in part with an equivalent amount of caustic potash. The proportion of lactic acid generally required to neutralize the caustic (if no chlor-acid is used for this purpose) is about 0.06 to about 0.07 part per part of phenol.

Alpha-chlorpropionic acid may be used in place of all or part of that used in any of the above examples. Obviously mixtures of any of the chlor-acids may be employed. About 2–5% of the chlor-acid in addition to sufficient acid (lactic or chlor-acid) to neutralize the caustic alkali is generally adequate.

Resinous materials made according to the invention described above may be colored with dyes or pigments which are not affected by the chlorinated acids. Various effects that may be obtained with the use of dyes are well known in the art.

Products made according to my invention may be cast in the form of rods, tubes, sheets, etc., and such forms are particularly suitable for machining and cutting into particular shapes for various purposes. It is also possible to cast or mold the resins directly into the shapes desired for actual commercial purposes. My invention renders the casting of phenol-formaldehyde resins into various complex shapes more practicable since rubber molds may be used and since much shorter periods of time are required for curing. The use of rubber molds is generally not feasible with slow curing resins of the type described by Pantke since rubber deteriorates so very rapidly upon long exposure to the elevated temperatures required for polymerization.

Obviously many modifications and variations in the processes and compositions described above may be made without departing from the spirit and scope of the invention as defined in the appended claims.

I claim:

1. A process of producing a low temperature phenol-formaldehyde resin which comprises heating 1 part of phenol with about 2–2½ parts of a 37% solution of formaldehyde in water in the presence of about 0.03 part of caustic alkali at a temperature of about 60–80° C. for about 2–4 hours, evaporating the water under vacuum, the temperature of the resinous mass which tends to drop being maintained at or raised to about 60–80° C., adding sufficient acid selected from the group consisting of chloracetic acids and alpha-chlorpropionic acid to neutralize the caustic present, together with an excess of about 2–5%, adding about 0.1–0.2 part of glycerine, continuing the dehydration with heat and vacuum until a sample of the resinous mass upon being dropped in water at a temperature of about 11–13° C. forms a ball of just sufficient hardness to yield slightly to pressure between the fingers, then casting the resinous mass into molds and subjecting the cast resin to a temperature of about 80° C. for about 24–36 hours.

2. A process of producing a low temperature phenol-formaldehyde resin which comprises heating 1 part of phenol with about 2–2½ parts of a 37% solution of formaldehyde in water in the presence of about 0.03 part of caustic alkali at a temperature of about 60–80° C. for about 2–4 hours, evaporating the water under vacuum, the temperature of the resinous mass which tends to drop being maintained at or raised to about 60–80° C., adding sufficient lactic acid to neutralize the caustic present, adding about 0.1–0.2 part of glycerine, continuing the dehydration with heat and vacuum until a sample of the resinous mass upon being dropped in water at a temperature of about 11–13° C. forms a ball of just sufficient hardness to yield slightly to pressure between the fingers, adding a small proportion of a substance selected from the group consisting of chloracetic acids and alpha-chlorpropionic acid, then casting the resinous mass into molds and subjecting the cast resin to a temperature of about 80° C. for about 24–36 hours.

3. A process of producing a low temperature phenol-formaldehyde resin which comprises heating 1 part of phenol with about 2–2½ parts of a 37% solution of formaldehyde in water in the presence of about 0.03 part of caustic alkali at a temperature of about 60–80° C. for about 2–4 hours, evaporating the water under vacuum, the temperature of the resinous mass which tends to drop being maintained at or raised to about 60–80° C., adding sufficient dichloracetic acid to neutralize the caustic present, together with an excess of about 2–5%, adding about 0.1–0.2 part of glycerine, continuing the dehydration with heat and vacuum until a sample of the resinous mass upon being dropped in water at a temperature of about 11–13° C. forms a ball of just sufficient hardness to yield slightly to pressure between the fingers, then casting the resinous mass into molds and subjecting the cast resin to a temperature of about 80° C. for about 24–36 hours.

EDWARD L. KROPA.